E. M. LOW.
PROTRACTOR OR SPACING INSTRUMENT.
APPLICATION FILED SEPT. 11, 1903.
918,065.
Patented Apr. 13, 1909.
3 SHEETS—SHEET 1.
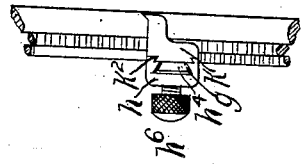
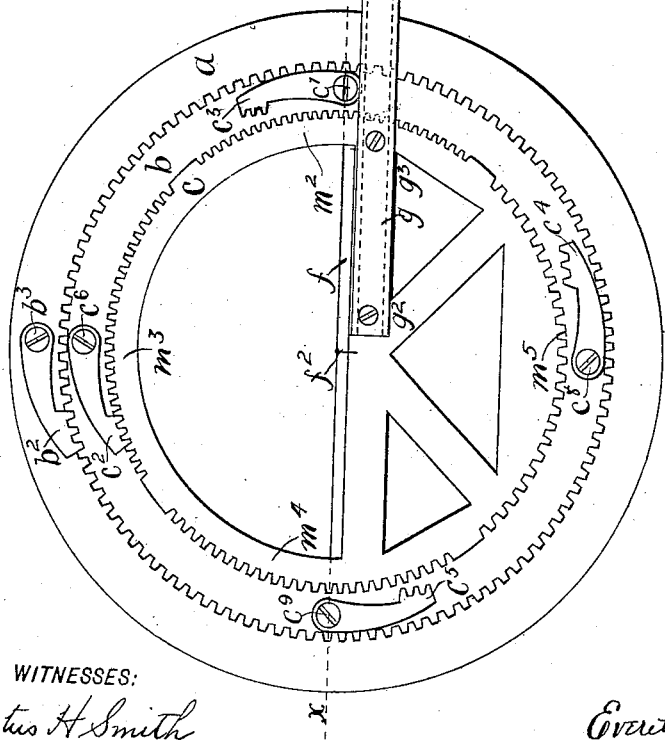
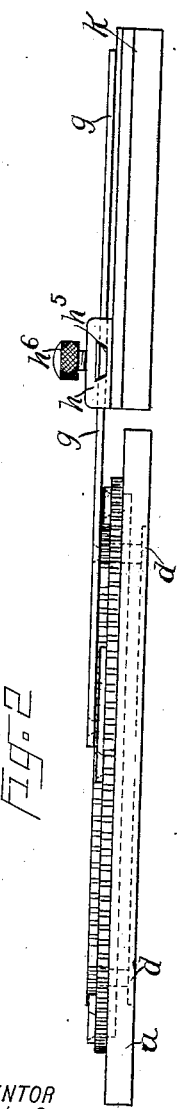
WITNESSES:
Augustus H Smith
Samuel B Busterd
INVENTOR
Everett M. Low

E. M. LOW.
PROTRACTOR OR SPACING INSTRUMENT.
APPLICATION FILED SEPT. 11, 1903.

918,065.

Patented Apr. 13, 1909.
3 SHEETS—SHEET 2.

WITNESSES:

INVENTOR
Everett M. Low

E. M. LOW.
PROTRACTOR OR SPACING INSTRUMENT.
APPLICATION FILED SEPT. 11, 1903.
918,065.
Patented Apr. 13, 1909.
3 SHEETS—SHEET 3.
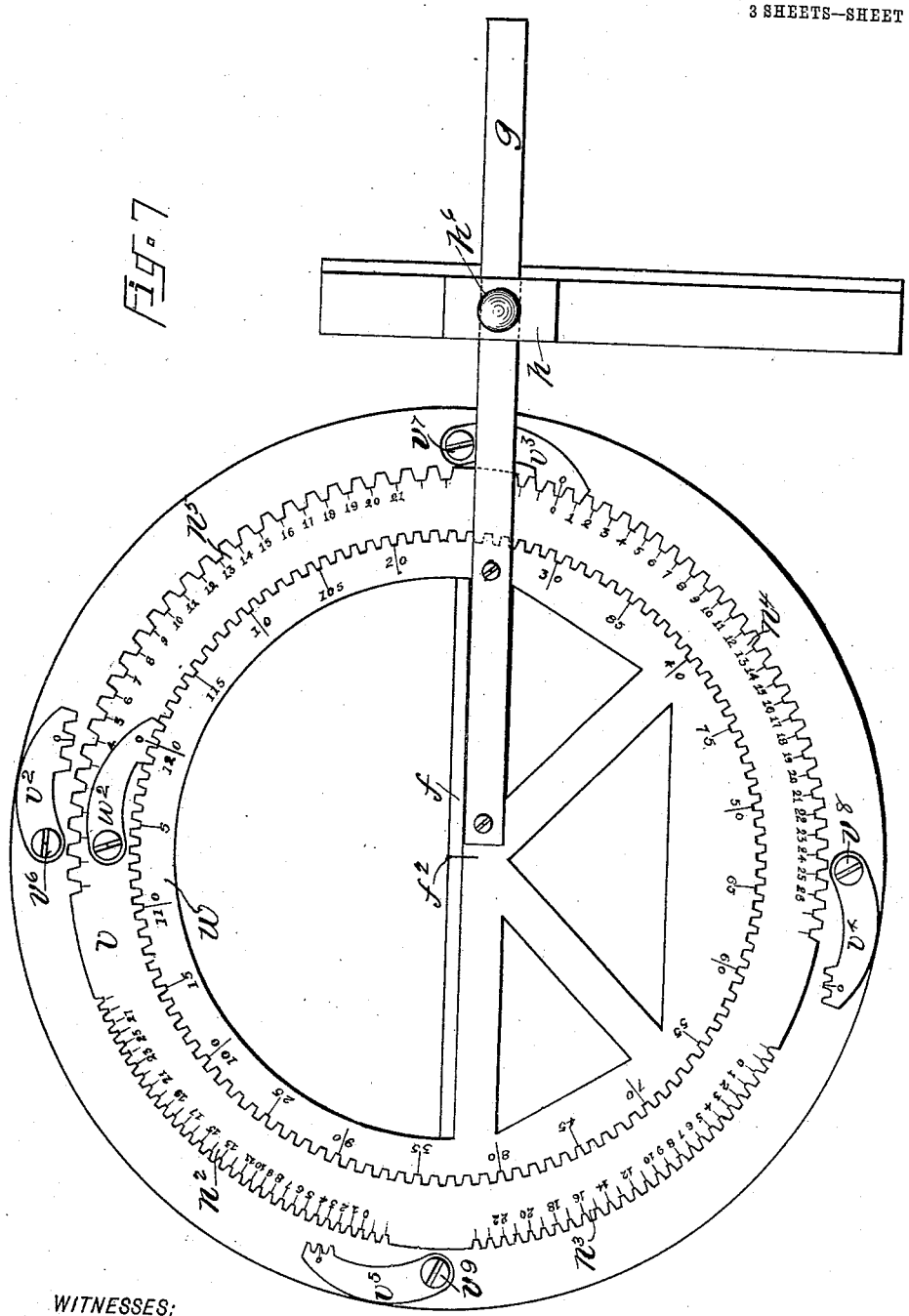
WITNESSES:
Augustus H. Smith
Samuel B. Busteed
INVENTOR
Everett M. Low

UNITED STATES PATENT OFFICE.

EVERETT M. LOW, OF NEW YORK, N. Y.

PROTRACTOR OR SPACING INSTRUMENT.

No. 918,065.      Specification of Letters Patent.      Patented April 13, 1909.

Application filed September 11, 1903. Serial No. 172,850.

*To all whom it may concern:*

Be it known that I, EVERETT M. LOW, a citizen of the United States, residing at New York, Brooklyn, in the county of Kings and State of New York, have invented a new and useful Protractor or Spacing Instrument, of which the following is a specification.

The object of my invention is to provide an instrument for the use of draftsmen, engineers and others, whereby the circumference of a circle may be divided into any number of equal parts which might be required in laying out the teeth of gear and ratchet wheels and it can also be used to lay off degrees and minutes; it thus is adapted to a wide range of work for which other protractors can not be used. I can also use my improved protractor for laying off sines, chords and tangents and for describing polygons. I attain these objects by the instrument which is hereinafter fully described and the nature thereof set forth in the claims.

Figure 4:
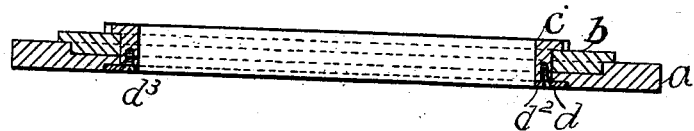
Figure 5:
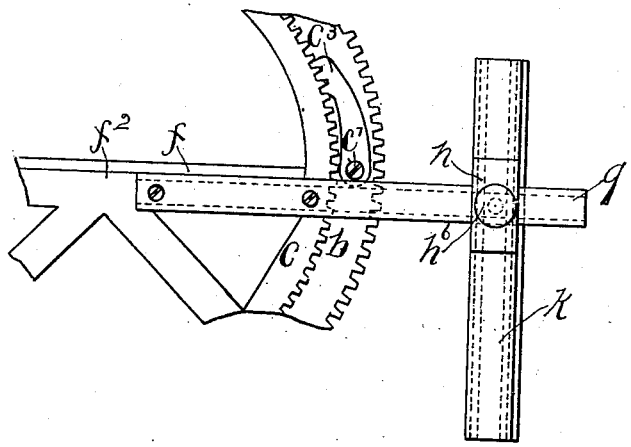
Figure 6:
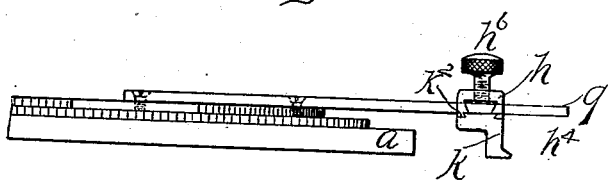

Referring to the drawings, in which like characters refer to like parts: Figure 1 is a plan view, Fig. 2 is a side elevation of Fig. 1 and Fig. 3 is an end view of the bar or ruler $k$, and shows only so much of the instrument as is necessary to make clear the connection of said ruler therewith. Fig. 4 is a section on line $x-x$, Fig. 1, through the center of the instrument. Fig. 5 is a plan of a portion of the instrument, showing the ruler $k$, in a position at right angles to that in which it is shown in Fig. 1. Fig. 6 is a side elevation of Fig. 5. Fig. 7 is a plan view of a modified form of the instrument.

In the accompanying drawings, $a$, is the base plate, which supports and serves as a bearing for the rotative parts, $b$, is a toothed ring or gear, supported by and turning freely in the base plate $a$, said gear being shown as having its entire periphery cut with teeth of the same pitch.

C, is a gear, supported by and turning freely in the gear $b$, and also in the base plate $a$, and may be rotated either by itself or with the gear $b$. The gears $b$, and $c$, are held in place by the ring $d$, secured to the gear $c$, by the screws $d^2$, and $d^3$, said ring fitting into a recess in base plate $a$; the gear $c$ and the ring $d$ being raised slightly above the bottom of the base plate $a$, which allows the free rotation of gear $c$, and ring $d$, over any surface on which the base plate $a$, rests, said ring $d$ serving to hold the gears $b$ and $c$, in place and at the same time allows the free rotation of said gears. The pawl $b^2$ is attached to base plate $a$, by the screw $b^3$ said pawl being movable into and out of engagement with the gear $b$. The gear $c$, is shown as having four segments $m^2$, $m^3$ $m^4$ and $m^5$, each segment having a different number of teeth in the same arc; this is not necessary as the entire periphery may have teeth of the same pitch, but by having several segments I increase the number of different combinations that can be made with the gears $b$, and $c$. I have shown only four segments but it is obvious that several more may be used if desired as it is only necessary to have in each segment, such a number of teeth as to allow a movement under the control of its pawl, of such a part of a whole revolution as is an exact divisor of the number of teeth in the gear $b$, and also of the number of teeth there would be in the entire periphery of the gear $c$, of the same pitch as the teeth of the segment.

The essential feature of the instrument is the gears $b$ and $c$ having a different number of teeth in the same arc and adapted to be rotated a distance equal to one or more teeth in the same or different directions whereby I am enabled to move a ruler attached to the gear $c$ the sum or the difference of the movements of the gears $b$ and $c$.

The pawls $c^2$, $c^3$, $c^4$, and $c^5$, are attached to the gear $b$, by screws $c^6$, $c^7$, $c^8$, and $c^9$, said pawls being movable into and out of engagement with their corresponding segments on the gear $c$; as many pawls being necessary as there are segments having teeth of different pitches.

The sizes of the teeth in the different segments of gear $c$, are exaggerated in order to show the difference more clearly. It is immaterial whether the gear $b$, as shown has its entire periphery cut with teeth of the same pitch and the gear $c$, has several segments, or the gear $b$, has several segments and the gear $c$, has its entire periphery cut with teeth of the same pitch.

Each of the segments $m^2$, $m^3$, $m^4$, and $m^5$, must have such a number of teeth as to allow the gear $c$, to move such a fractional part of a revolution without getting beyond the range of its corresponding pawl, that the denominator of the fraction will be an exact divisor of the number of teeth in the gear $b$, and also of the number of teeth there would be in the gear $c$, if its entire periphery were cut with teeth of the same pitch as the segment. If the gear $b$ has 180 teeth and the segment $m^2$ on gear $c$ has teeth of such a pitch that the entire circumference would have 200 teeth, it is only necessary for the segment $m^2$ to have a sufficient number of teeth to allow a movement of the gear $c$, equal to one tenth of a revolution, for ten is a common divisor of 180, the number of teeth in the gear $b$, and of 200 the number of teeth the gear $c$, would have if its entire circumference had teeth of the same pitch as the segment $m^2$. The segment $m^3$ may have teeth of such a pitch that the entire circumference of gear $c$ would have 192 teeth then the segment would require such a number of teeth as to allow a movement of the gear $c$, equal to one twelfth of a revolution, or any other fractional part, the denominator of which fraction is a common divisor of 180 the number of teeth in the gear $b$ and 192 the number of teeth in the whole circumference of the gear $c$ if of the same pitch as the teeth in the segment $m^3$. Similarly the segment $m^4$ may have teeth of such a pitch that there would be 189 teeth in the entire circumference of the gear $c$ in which case we may have a movement of one ninth of a revolution. The segment $m^5$ may have teeth of such a pitch that there would be 165 teeth in the entire circumference of the gear $c$, when a movement of one-fifth or one-fifteenth may be used.

The gear $c$, has a bar or ruler $f$ across it, the edge of which is on a line with the center of the gear, said ruler having a mark $f^2$ midway of its length, by which the center of the instrument can be brought to the center it is desired to work from; the other half of the space inside the rim of the gear $c$, is open, giving a clear view of the drawing or other surface under the instrument, this allowing a line to be drawn through or from the center.

The arm $g$ is secured to the gear $c$, by the screws $g^2$, and $g^3$ and extends beyond the base plate $a$; adapted to slide onto the arm $g$ is the head $h$, which has two dovetailed slots $h^4$, and $h^5$ at right angles to each other. The bar or ruler $k$, is fitted to slide in the dovetailed slot $k^2$ in the head $h$, and by means of the two dovetailed slots $h^4$, and $h^5$ in the head $h$, which fit the arm $g$, the head $h$, can be placed on the arm $g$, by means of the slot $h^4$ in such a position as to bring the ruler $k$, in the position shown in Figs. 1, 2, and 3; or by means of the slot $h^5$, the head $h$, can be placed on the arm $g$, so as to bring the ruler $k$, in the position shown in Figs. 5, and 6. The screw $h^6$ serves to clamp the ruler $k$, to the head $h$, and the head $h$ to the arm $g$, whichever position the head occupies on the arm $g$. The ruler $k$ is movable endwise in the head $h$, and the head $h$ is also movable lengthwise on the arm $g$. The ruler $k$ may be used as shown in Fig. 1 when working on the outside of the base plate $a$, or it may be used as shown in Fig. 5, when it is desired to draw sines, tangents, chords or polygons, when working on the inside of the instrument, the head $h$, and ruler $k$, may be removed and the ruler $f$, is used, the working edge of both rulers being on a line through the center of the instrument, and the edge of the rulers being beveled as shown on ruler $k$ in Fig. 3.

In using my improved protractor I may by using the gear $b$ only, get a number of different divisions, if the gear $b$, has 180 teeth I can divide a circle into any number of parts that is contained in 180. By using the gear $b$, having 180 teeth and the segment $m$, on gear $c$ having 20 teeth in an arc of one-tenth which would be equivalent to 200 teeth in its whole circumference. I may by moving the gear $b$, and with it the gear $c$, forward or clockwise, a distance of one tooth and then moving the gear $c$, backward a distance of one tooth on segment $m^2$, get a division represented by the difference between one-one hundred and eightieth and one-two hundredth of a revolution which is one-eighteen hundredth of the circumference of a circle or twelve minutes, and the rulers $f$, and $k$, would move over that arc. This operation may be repeated until we have reached the limit of the teeth in the segment, when the gear $b$, is turned backward one-tenth of a revolution and the gear $c$, is turned forward one-tenth of a revolution when the edge of rulers $f$, and $k$, will coincide with the last division made and we proceed as before. Turning the gear $b$, forward two teeth and the gear $c$, backward one tooth on segment $m^2$, gives a division of one-three hundredth. Three teeth forward on the gear $b$, and two teeth backward on the segment $m^2$, of the gear $c$, gives a division of one-one hundred and fiftieth. Two teeth forward on the segment $m^2$, of the gear $c$, and one tooth backward on the gear $b$, gives a division of one-two hundred and twenty-fifth. In a similar manner by combining different numbers of teeth on the gear $b$, and the segment $m^2$, on the gear $c$, a number of other divisions may be obtained that are multiples of numbers that are common divisors of 180 and 200. If it is desired to divide a circle into 50 equal parts, a movement of four teeth on the segment $m^2$, would equal one-fiftieth of the circumference and after repeating the movements of four teeth at a time until we have reached the limit of the teeth in the segment, it is necessary to turn the gear $c$, backward one-tenth of a revolution or 20 teeth on the segment $m^2$, and then turn the gear $b$, forward one-tenth of a revolution or 18 teeth when the rulers $f$, and $k$, will coincide with the last division made, and we proceed as before. One tooth forward on the gear $b$, having 180 teeth and one tooth backward on the segment $m^3$ on the gear $c$, having 16 teeth in an arc of one-twelfth which would be equivalent to 192 teeth on its whole circumference would give a division represented by the difference between one-one hundred and eightieth and one-one hundred and ninety-secondth which is one-twenty-eight hundred and eightieth of the circumference or one-eighth of one degree. Other divisions may be obtained in the manner before described that are multiples of numbers that are common divisors of 180 and 192. The segment $m^4$ of the gear $c$, having 21 teeth in an arc of one-ninth, which would be equivalent to 189 teeth on the whole circumference can be used in combination with the gear $b$, to obtain divisions that are multiples of numbers that are common divisors of 180 and 189. The segment $m^5$ of the gear $c$, having 11 teeth in an arc of one-fifteenth which would be equivalent to 165 teeth on the whole circumference can be used in combination with the gear $b$, to obtain divisions that are multiples of numbers that are common divisors of 180 and 165. The pawl $b^2$ serves to determine the movement and to locate and retain the gear $b$ in position and the pawls $c^2$, $c^3$, $c^4$, and $c^5$ serve the same purpose for the gear $c$, only one pawl being used at a time on the gear $c$, and that being the one which corresponds with the teeth of the segment being used.

The manner of using my improved protractor is as follows: Place the center mark $f^2$ on the ruler $f$, on the center of the circle to be divided; if the circle is a small one the ruler $f$, is to be used and the divisions are made on the inside of the gear $c$; if the circle is a large one the ruler $k$, is to be used and the divisions are made on the outside of the instrument. In Fig. 1 of the drawing the gear $b$, is shown as locked by its pawl $b^2$, the gear $c$, is shown with the pawl $c^2$ interlocked with the teeth of the segment $m^3$. To divide a circle into equal divisions of one-eighth of one degree, release the gear $b$, and turn it forward or clockwise a distance of one tooth and then lock it with pawl $b^2$. The gear $c$, has moved forward with the gear $b$ moving the ruler $f$ and $k$ forward one-one hundred and eightieth of a revolution, now release the gear $c$, by throwing the pawl $c^2$ out of engagement with the segment $m^3$ and turn the gear $c$, backward one tooth and again lock with the pawl $c^2$. The rulers $f$ and $k$ have moved forward one-one hundred and eightieth and backward one-one hundred and ninety-second of a revolution making the actual forward movement of the rulers $f$ and $k$ equal to the difference between one-one hundred and eightieth and one-one hundred and ninety-second or one-twenty-eight hundred and eightieth of a revolution or one-eighth part of one degree. This operation is repeated until we have turned the gear $b$ forward and the gear $c$ backward any number of teeth within the limit of the segment $m^3$; it is now necessary to place the gear $c$ in such a position that the hereinbefore described operation may be repeated which is done by turning the gear $c$, forward 16 teeth or one-twelfth of a revolution and the gear $b$, backward 15 teeth or one-twelfth of a revolution or any other part of a revolution may be used which is within the limit of the segment, which part of a revolution is represented by a fraction whose numerator is one and whose denominator is contained a whole number of times in 180 and 192. The gears $b$ and $c$ will now be in the first described position with reference to their pawls but the rulers $f$, and $k$, will have advanced a distance around the circle equal to one-twenty-eight hundred and eightieth multiplied by the number of movements of the gear $b$ forward and the gear $c$ backward. This operation is repeated until the whole or any desired part of the circle is divided.

In practice it would be preferable to have the teeth of the gears $b$, and $c$, numbered, as the numbers would facilitate the use of the instrument, but are not absolutely essential to its use. The ruler $k$, is movable in the head $h$, and the head $h$ is also movable on the bar $g$, and the ruler may be used as shown in Fig. 1 when working at a great distance from the center or it may be placed on the bar $g$, in the position shown in Fig. 5 when it is desired to draw tangents or chords or lay out polygons; when working on small work this head $h$, and ruler $k$, may be removed and the ruler $f$, used on the inside of the gear $c$.

In Fig. 7 I have shown a modified form of the instrument in which the gear $v$, which corresponds in position to the gear $b$ in Figs. 1 to 6, has its rim divided into segments, while the gear $w$, which corresponds in position to the gear $c$, in Figs. 1 to 6, has its entire periphery cut with teeth of the same pitch. This arrangement necessitates a corresponding change in the location of the pawls from that shown in Fig. 1, four of the pawls which are for engagement with the teeth of the segments of the gear $v$, being attached to the base plate, and the one which is for engagement with the teeth of the gear $w$, being attached to the gear $v$.

I have for convenience shown the gear $w$, as having 120 teeth and each of the four segments of the gear $v$, as having teeth of such a pitch, that the teeth of each segment differs from the teeth of the other segment and from the teeth of the gear $w$, in the number of teeth in the same arc. The size of the teeth are exaggerated the more clearly to show that such difference is intended. I have shown the teeth of the gear $v$, and $w$, as having numbers to more easily determine the desired amount of movement of the said gears.

Having thus described my invention, what I claim and desire to secure by Letters Patent, is—

1. In a protractor or spacing instrument, a supporting plate, a gear adapted to be rotated in said plate, a gear adapted to be rotated in the aforesaid plate and gear, the said gears having a different number of teeth in the same number of degrees of arc, an arm adapted to be rotated around a central point, with one or both of said gears and means for securing said gears and said arm in the desired position.

2. In a protractor or spacing instrument, a supporting plate, a gear adapted to be rotated in said plate, a concentric gear having a ruler secured thereto, said gears having a different number of teeth in the same number of degrees of arc and adapted to be rotated one or more teeth in the same or opposite directions whereby the gear having the ruler attached is given a rotative motion equal to the sum or difference of the movements of the gears and means for securing said gears in the desired position for the purpose described.

3. In a protractor or spacing instrument, two concentric rings, a ruler secured to one of said rings, the ruler being adapted to a rotative movement, in either direction, with one or both of said rings, and means for preventing the movement of said rings as described.

4. In a protractor or spacing instrument, the combination of a supporting plate $a$, a gear $b$, adapted to be rotated in said plate, a pawl adapted to be moved into and out of engagement with the teeth of said gear, a gear $c$, having a ruler forming a part thereof, said gear $c$, being adapted to be rotated in the plate $a$, and the gear $b$, and a pawl attached to the gear $b$, and adapted to be moved into and out of engagement with the teeth of the gear $c$, substantially as described.

5. In a protractor or spacing instrument, the combination of two concentric toothed rings and a ruler secured to one of said rings; the rim of one of said rings being divided into segments, said segments differing from each other in having a different number of teeth in the same number of degrees of arc; said toothed rings being capable of a rotative movement in either direction, whereby the ruler may be moved a predetermined distance, and means for securing said rings and said ruler in the desired position for the purpose described.

6. In a protractor or spacing instrument, the combination of the supporting plate $a$, the gear $b$, and the gear $c$, the gear $c$, having its rim divided into two or more segments; the teeth of the gear $b$, and the teeth of the segments of the gear $c$, differing in the number of teeth in the same number of degrees of arc, and pawls having teeth corresponding to the teeth of the gear $b$, and the teeth of the segments of the gear $c$, for the purpose described.

7. In a protractor or spacing instrument, the combination of the supporting plate $a$, the gear $b$, the pawl $b^2$, adapted to be moved into and out of engagement with the teeth of the gear $b$, the gear $c$, having its rim divided into two or more segments, the segments having a different number of teeth in the same arc, and two or more pawls attached to the gear $b$, and adapted to be moved into and out of engagement with the teeth of the segments of the gear $c$.

8. In a protractor or spacing instrument, the combination of the plate $a$, the gear $b$, the pawl $b^2$, the gear $c$, having the segments $m^2$, $m^3$, $m^4$, and $m^5$, said segments differing from each other in the number of teeth in the same arc and the pawls $c^2$, $c^3$, $c^4$, and $c^5$, said pawls being adapted to be moved into and out of engagement with the teeth of the segments of the gear $c$, as and for the purpose described.

9. In a device of the class described, two concentric toothed rings, one of said rings having its rim divided into segments having a different number of teeth in the same number of degrees of arc, and an arm adapted to be moved around a central point a series of predetermined distances corresponding to one or more teeth of either of the said rings and pawls adapted to engage the teeth of said rings for securing the said arm in the desired position.

10. In a device of the class described the gear $b$ and the gear $c$; the gear $c$ having its rim divided into segments, the teeth of the gear $b$ and the teeth of the segments of the gear $c$ differing in the number of teeth in the same number of degrees of arc, and an arm adapted to be moved around a central point a series of predetermined distances corresponding to the sum or the difference of one or more teeth of the gear $b$ and one or more teeth of one of the segments of the gear $c$, and pawls adapted to engage the teeth of the said gears for securing the said arm in the desired position.

11. In a protractor or spacing instrument, the combination of the plate $a$, the gear $b$, the pawl $b^2$, the gear $c$, the pawls $c^2$, $c^3$, $c^4$, and $c^5$, the ruler $f$, the arm $g$, the head $h$, the ruler $k$, and the screw $h^6$ as and for the purpose described.

12. In a device of the class described, a toothed ring divided into segments having a different number of teeth in the same number of degrees of arc and an arm adapted to be moved around a central point a series of predetermined distances, the said distances corresponding to one or more teeth of one of the segments of said gear and pawls adapted to engage the teeth of said segments for securing the said arm in the desired position.

In testimony whereof I have signed my name to this specification in the presence of two subscribing witnesses.

EVERETT M. LOW.

Witnesses:
WM. H. WOOD,
JAMES H. WOOD.